Patented Aug. 25, 1936

2,052,215

UNITED STATES PATENT OFFICE 2,052,215

PROCESS FOR PRODUCING A SOYA FLOUR WITH CHANGED FLAVOR AND THE PRODUCT THEREOF

Martin Cohn, Berlin-Friedenau, Germany, assignor to firm M. Neufeld & Co., Berlin, Germany No Drawing. Application July 17, 1933, Serial No. 680,895. In Germany July 20, 1932

12 Claims. (Cl. 99—99)

This invention relates to a process for producing a soya flour with changed flavor and the product of said process. For this purpose a special process is necessary for eliminating the bitter flavor or for roasting.

Some of the known processes for eliminating the bitter flavor and for roasting are complicated and others are uncertain of success. It has been proposed to treat soya beans with steam or to heat same to 120 to 300° C. The steam treatment may easily lead to undesired changes in the soya bean. The above mentioned roasting also results in an irregular product because the core is then different in flavor and appearance from the remaining portions of the fruit.

For the purpose of eliminating the bitter flavor the whole soya fruit is, according to the invention, subjected to a treatment with liquid at moderate temperatures and subsequently to a heat treatment of the soya in ground condition chiefly for changing the flavor. The whole soya beans are subjected to the action of acidulated water at approximately but not above 75° C. for about two hours. After drying and grinding the soya flour thus obtained is subjected to a heat treatment according to the desired color and flavor.

In this manner it is possible to produce, without special auxiliary means and additions, a soya flour having a biscuit-, cocoa-. or coffee-like flavor. The flavor depends merely upon the duration or the temperature employed during the heat treatment of the flour.

The soya bean may be subjected to the treatment with liquid in unshelled condition. It is preferable to carry out the shelling after the treatment with liquid and the drying, because the shelling is simpler in this condition.

It is also possible first to soften the soya beans in acidulated water at ordinary temperature and then treat them with water at approximately but not exceeding 75° C. for about two hours if necessary after washing. Under certain circumstances freshly acidulated water is employed for treating the washed beans with hot water.

For acidulating the water, which requires for example $\frac{1}{10}$ to 1 percent of acid by weight relative to the water, sulphuric acid, phosphoric acid, acetic acid, hydrochloric acid or the like may be employed. The acid may be neutralized after or during the treatment. It is therefore possible, to also impart an increased mineral salt content to the product. When employing phosphoric acid, it is advisable to neutralize with lime, whereby even after washing of the soya beans treated with hot water, the phosphate remains in the product.

Otherwise sodium hydroxide is employed for the neutralization.

The soya flour should then be subjected to an only moderate heat treatment. Even when stronger heat treatment is necessary, for example for the purpose of producing a flavor resembling coffee, moderate heating to about 50° C. should precede and the heat supply should be increased in stages, if necessary with temporary interruptions.

It is advisable to rapidly cool the flour after carrying out the heat treatment.

Under certain circumstances it is advisable to entirely or partly free the soya flour from its oil or fat content before the heat treatment. This may be carried out in a simple manner by pressing the flour. Thus, a flour ready for baking and an excellent salad oil are obtained at the same time.

The method according to the invention may for example be carried out in the following manner:—
Soak 10 kgs. of shelled soya beans in 10 kgs. of water containing about $\frac{1}{10}$% of one of the above mentioned acids. After a few hours wash the beans several times and place them in hot water having a maximum temperature of 75° C. When the beans have remained about two hours in the hot water, dry and grind the same. The flour from which the bitter flavor has thus been removed is then heated in a roasting apparatus at slowly rising temperature commencing at about 35° C., and with periodical interruptions of the heat supply until the desired flavor is attained, whereupon the flour is immediately cooled.

The process according to the invention, which is characterized by its simplicity and economy, supplies a pleasant tasting product of always uniform consistency which is absolutely harmless for human consumption and directly adapted to the requirements of the consuming industries.

I claim:

1. In a process of treating soya beans to produce a product having neutral taste without materially altering the composition from that of the untreated beans the step comprising soaking whole unshelled soya beans in weakly acidulated water at a temperature of about but not exceeding 75° C. for a period of about two hours.

2. In a process of treating soya beans to produce a product having neutral taste without materially altering the composition from that of the untreated beans the steps comprising soaking whole unshelled soya beans in weakly acidulated water at a temperature of about but not exceeding 75° C. for a period of about two hours, removing the beans from the acidulated water, shelling the beans, and drying the whole beans.

3. The process of treating soya beans to produce a product having neutral taste without materially altering the composition from that of the untreated beans comprising soaking whole unshelled soya beans in weakly acidulated water, then exposing the unshelled beans to pure water at a temperature of about but not exceeding 75° C. for a period of about two hours, shelling and drying the whole beans and grinding the beans to flour.

4. The process of treating soya beans to produce a product having neutral taste without materially altering the composition from that of the untreated beans comprising soaking whole unshelled soya beans in weakly acidulated water, and then exposing the whole beans to weakly acidulated water at a temperature of about but not exceeding 75° C. for about two hours.

5. The process of treating soya beans to produce a product having neutral taste without materially altering the composition from that of the untreated beans comprising soaking whole unshelled soya beans in weakly acidulated water, washing the beans, and then exposing the whole beans to weakly acidulated water at about but not exceeding 75° C. for about two hours.

6. In a process of treating soya beans to produce a product having neutral taste without materially altering the composition from that of the untreated beans the step comprising soaking whole unshelled soya beans in water weakly acidulated with an acid of the group consisting of sulphuric acid, phosphoric acid, and hydrochloric acid at about 75° C. for about but not exceeding two hours.

7. In a process of treating soya beans to produce a product having neutral taste without materially altering the composition from that of the untreated beans the steps comprising soaking whole unshelled soya beans in weakly acidulated water at a temperature of about but not exceeding 75° C. for a period of about two hours, and neutralizing the acid in the beans.

8. In a process of treating soya beans to produce a product having neutral taste without materially altering the composition from that of the untreated beans the steps comprising soaking whole unshelled soya beans in water weakly acidulated with phosphoric acid at a temperature of about but not exceeding 75° C. for a period of about two hours, and neutralizing the acid with lime.

9. In a process of treating soya beans to produce a product having changed taste without materially altering the composition from that of the untreated beans the steps comprising soaking whole unshelled soya beans in weakly acidulated water at a temperature of about but not exceeding 75° C. for a period of about two hours, drying the whole beans, grinding the beans to flour, and then heating the flour to 35° C. and thereafter gradually raising the temperature.

10. In a process of treating soya beans to produce a product having changed taste without materially altering the composition from that of the untreated beans the steps comprising soaking whole unshelled soya beans in weakly acidulated water at a temperature of about but not exceeding 75° C. for a period of about two hours, drying the whole beans, grinding the beans to flour, and then heating the flour to 35° C. and thereafter gradually raising the temperature with periodic interruptions of the heat supply.

11. In a process of treating soya beans to produce a product having changed taste without materially altering the composition from that of the untreated beans the steps comprising soaking whole unshelled soya beans in weakly acidulated water at a temperature of about but not exceeding 75° C. for a period of about two hours, drying the whole beans, grinding the beans to flour, and then heating the flour to 35° C. and thereafter gradually raising the temperature to a desired temperature and then rapidly cooling the product.

12. In a process of treating soya beans to produce a product having changed taste without substantial loss of soluble substance and without protein alteration the steps comprising soaking whole unshelled soya beans in weakly acidulated water at a temperature of about but not exceeding 75° C. for a period of about two hours, removing the beans from the acidulated water, shelling the beans, and drying the whole beans, grinding the beans to flour, pressing part of the fat content from the flour, and heat treating the flour.

MARTIN COHN.